United States Patent
Jung et al.

(10) Patent No.: US 8,265,149 B2
(45) Date of Patent: Sep. 11, 2012

(54) METHOD AND APPARATUS ENCODING AND/OR DECODING IMAGE BY USING DIFFUSION PROPERTIES OF THE IMAGE

(75) Inventors: Jae-woo Jung, Seoul (KR); Dae-hee Kim, Suwon-si (KR); Dae-sung Cho, Seoul (KR); Hyun-mun Kim, Seongnam-si (KR); Woon-Il Choi, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1034 days.

(21) Appl. No.: 12/076,278

(22) Filed: Mar. 14, 2008

(65) Prior Publication Data
US 2009/0110069 A1    Apr. 30, 2009

(30) Foreign Application Priority Data
Oct. 29, 2007   (KR) .................. 10-2007-0109155

(51) Int. Cl.
*H04N 7/12*    (2006.01)
(52) U.S. Cl. ................................ 375/240.12
(58) Field of Classification Search .............. 375/240, 375/240.01, 240.12–240.16; 382/232, 246, 382/238
See application file for complete search history.

(56) References Cited

U.S. PATENT DOCUMENTS

| | | | |
|---|---|---|---|
| 7,881,377 B2* | 2/2011 | Arimura et al. | 375/240.12 |
| 2003/0223496 A1 | 12/2003 | Sun et al. | |
| 2006/0018385 A1* | 1/2006 | Lee | 375/240.24 |
| 2006/0039473 A1* | 2/2006 | Filippini et al. | 375/240.16 |
| 2007/0121731 A1* | 5/2007 | Tanizawa et al. | 375/240.24 |
| 2008/0107177 A1* | 5/2008 | Han et al. | 375/240.15 |
| 2008/0187044 A1* | 8/2008 | Kim et al. | 375/240.15 |
| 2009/0028241 A1* | 1/2009 | Takahashi et al. | 375/240.12 |

FOREIGN PATENT DOCUMENTS

| | | |
|---|---|---|
| KR | 10-2003-0062341 | 7/2003 |
| KR | 10-2005-0112445 | 11/2005 |
| KR | 10-2005-0114751 | 12/2005 |

* cited by examiner

*Primary Examiner* — Frank Duong
(74) *Attorney, Agent, or Firm* — Staas & Halsey LLP

(57) ABSTRACT

Provided are a method and apparatus for encoding/decoding a moving picture by using the diffusion properties of the image. In the method, a value of a current pixel is predicted from the values of neighboring pixels of the current pixel, based on the variations between the values of the neighboring pixels present in directions toward the current pixel; a correction value of the predicted value is calculated from at least one variation from among the variations; the value of the current pixel is determined by reflecting the correction value into the predicted value; and then, the original image is reconstructed using the determined value of the current pixel.

20 Claims, 10 Drawing Sheets

FIG. 2
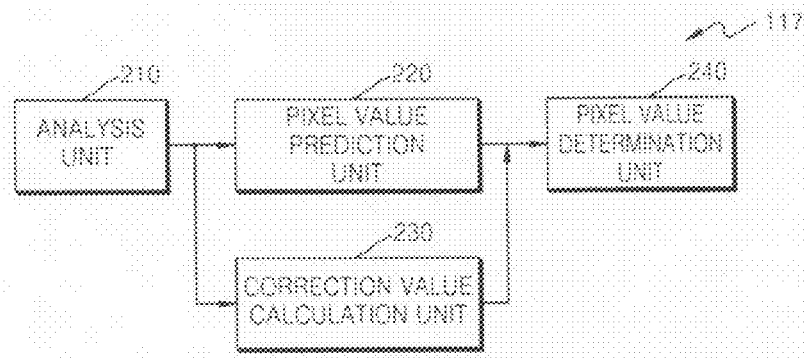
FIG. 3
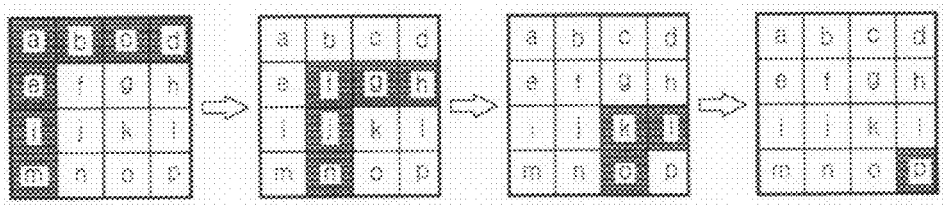
FIG. 4

METHOD AND APPARATUS ENCODING AND/OR DECODING IMAGE BY USING DIFFUSION PROPERTIES OF THE IMAGE

CROSS-REFERENCE TO RELATED PATENT APPLICATIONS

This application claims the benefit of Korean Patent Application No. 10-2007-0109155, filed on Oct. 29, 2007, in the Korean Intellectual Property Office, the disclosures of which are incorporated herein in their entirety by reference.

BACKGROUND

1. Field

One or more embodiments of the present invention relate to a method and apparatus encoding and/or decoding an image.

2. Description of the Related Art

Recently, representative methods of encoding and/or decoding an image are an inter prediction method of removing temporal redundancy of an image and an intra prediction method of removing spatial redundancy of an image. In particular, the H.264/AVC (Advanced Video Coding) standards include the intra prediction method in which values of pixels of an image are predicted from the values of neighboring pixels using nine directions, in units of 4×4 block basis.

SUMMARY

One or more embodiments of the present invention provide a method and apparatus encoding and/or decoding an image by using the diffusion properties of the image in order to increase compression efficiency or reduce the degree of complexity.

Additional aspects and/or advantages will be set forth in parts in the description which follows and, in part, will be apparent from the description, or may be learned by practice of the invention.

According to an aspect of the present invention, there is provided a method of decoding a moving picture, the method including reconstructing the residue between a current image from among a plurality of images constituting the moving picture, and a predicted image of the current image by decoding a bitstream; predicting a value of a current pixel of the current image from at least one neighboring pixel from among neighboring pixels located in various directions toward the current pixel, based on the variations between values of the neighboring pixels; and generating a reconstructed image of the current image by combining the reconstructed residue with the predicted image containing the predicted value of the current pixel.

According to another aspect of the present invention, there is provided a computer readable medium having embodied thereon a computer program for executing the method.

According to another aspect of the present invention, there is provided a method of encoding a moving picture, the method comprising predicting a value of a current pixel of a current image from among a plurality of images constituting a moving picture from at least one neighboring pixel from among neighboring pixels located in various directions toward the current pixel, based on the variations between values of the neighboring pixels; generating a predicted image of the current image based on the predicted value of the current pixel; and encoding the residue between the current image and the predicted image.

BRIEF DESCRIPTION OF THE DRAWINGS

These and/or other aspects and advantages will become apparent and more readily appreciated from the following description of the embodiments, taken in conjunction with the accompanying drawings of which:

FIG. 2 illustrates in detail a second intra prediction unit illustrated in FIG. 1;

FIG. 3 illustrates a 4×4 current block that is to be intra predicted, and 4×4 blocks that are to be used for intra prediction;

FIG. 4 illustrates a sequence of predicting pixels present in a 4×4 block that is to be intra predicted, according to an example embodiment of the present invention;

DETAILED DESCRIPTION OF THE EMBODIMENTS

Figure 1:
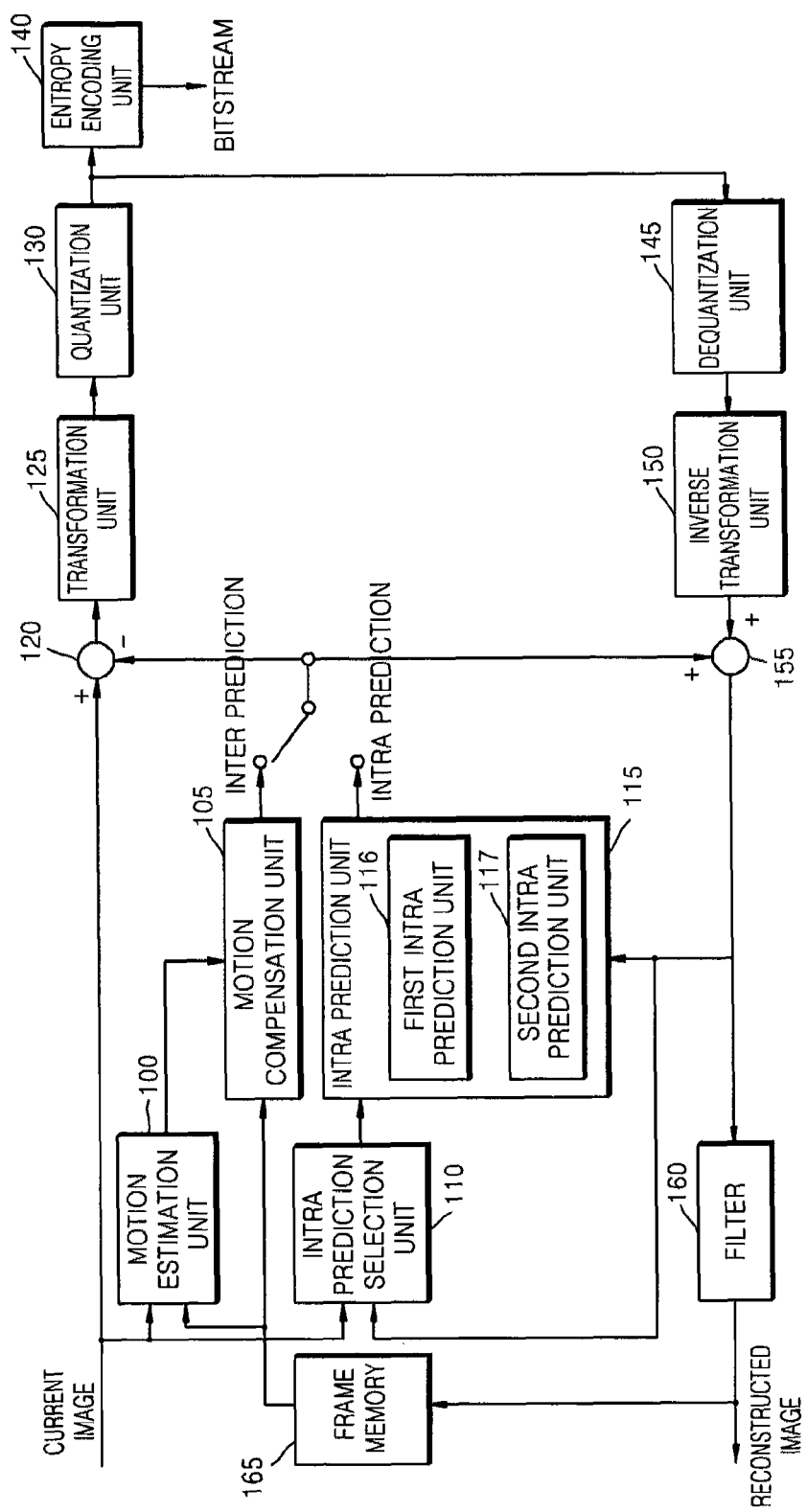
FIG. 1 illustrates a moving picture encoding apparatus according to an example embodiment of the present invention.

Reference will now be made in detail to embodiments, examples of which are illustrated in the accompanying drawings, wherein like reference numerals refer to the like elements throughout. In this regard, embodiments of the present invention may be embodied in many different forms and should not be construed as being limited to embodiments set forth herein. Accordingly, embodiments are merely described below, by referring to the figures, to explain aspects of the present invention.

FIG. 1 illustrates a moving picture encoding apparatus according to an example embodiment of the present invention. Referring to FIG. 1, the encoding apparatus includes a motion estimation unit 100, a motion compensation unit 105, an intra prediction selection unit 110, an intra prediction unit 115, a subtraction unit 120, a transformation unit 125, a quantization unit 130, an entropy encoding unit 140, a dequantization unit 145, an inverse transformation unit 150, an addition unit 155, a filter 160, and a frame memory 165.

The motion estimation unit 100 estimates the motion of an image being currently received from the outside from among a plurality of images constituting a moving picture (which will be hereinafter referred to as "current image"), based on at least one image from among previous reconstructed images that are stored in the frame memory 165 (which will be hereinafter referred to as "reference image"). In the present specification, the term, "image" may be replaced with an equivalent term, such as 'picture' or 'frame".

The motion compensation unit 105 generates a predicted image of the current image from at least one reference image from among the reference images stored in the frame memory 165, based on the motion of the current image estimated by the motion estimation unit 100. A method of generating predicted image of an current image from a reference image by using the motion estimation unit 100 and the motion compensation unit 105, is referred to as an inter prediction method.

The intra prediction selection unit 110 selects one of a first intra prediction method according to the H.264/AVC (Advanced Image Coding) standards and a second intra prediction method using diffusion properties of an image, according to the characteristics of the current image or the type of an application applied to the current image. The intra prediction unit 115 predicts the values of pixels of the current image according to the first intra prediction method or the second intra prediction selected by the intra prediction selection unit 110.

The intra prediction unit 115 includes a first intra prediction unit 116 that predicts the values of the pixels of the current image according to the first intra prediction method, and a second intra prediction unit 117 that predicts the values of the pixels of the current image according to the second intra prediction method.

The first intra prediction unit 116 divides the current image into a plurality of 4×4 or 16×16 sub blocks, and predicts the values of pixels of a sub block from the values of pixels of neighboring reference blocks adjacent to the sub block, in one of nine directions according to the H.264/AVC standards.

The second intra prediction unit 117 predicts the values of the pixels of the current image by using the diffusion properties of an image. The diffusion properties of an image indicate characteristics that a change between the values of pixels in the image diffuses in a random direction and not in a specific direction. In a conventional intra prediction method according to the H.264/AVC standards, the values of all pixels included in a block are predicted on a 4×4 or 16×16 block basis, only in one direction from among nine directions. Thus, the diffusion properties of an image cannot be reflected into the intra prediction, thus lowering the efficiency of the intra prediction.

In the current embodiment, the second intra prediction unit 117 predicts the values of the pixels of the current image on a pixel basis and not on a block basis, in one direction from among a plurality of directions, while considering the diffusion properties of an image. In this way, it is possible to predict the values of pixels more precisely than when using the conventional intra prediction. However, the conventional intra prediction method is advantageous in that the amount of calculation for intra prediction is small since prediction is performed on a block basis in one direction. Thus, the intra prediction selection unit 110 selectively employs the first intra prediction method when the efficiency of intra prediction is guaranteed according to the characteristics of an image even if prediction is performed on a block basis and only in one direction or in the case of an application that requires a small amount of calculation for intra prediction, and employs the second intra prediction method in the other cases.

FIG. 2 illustrates in detail a second intra prediction unit illustrated in FIG. 1. Referring to FIG. 2, the second intra prediction unit 117 includes an analysis unit 210, a pixel value prediction unit 220, a correction value calculation unit 230, and a pixel value determination unit 240.

The analysis unit 210 analyzes the characteristics of an image or the type of an application applied to the image, and determines an order of predicting pixels, a direction of diffusion, and a total number of pixels to be used for prediction. By determining the order of predicting pixels, the direction of diffusion, and the total number of pixels to be used, intra prediction can be performed adaptively to the characteristics of the image or the type of the application applied to the image. More specifically, the order of predicting pixels indicates the order of predicting the values of pixels present in a current block that is to be predicted. Intra prediction is performed starting from a left uppermost pixel of the current block to a right lowermost pixel thereof. An order of pixel prediction according to an exemplary embodiment of the present invention will later be described in detail with reference to FIGS. 4 and 8. The direction of diffusion indicates a direction from neighboring pixels of a current pixel that is to be predicted (hereinafter referred to as a current pixel) to the current pixel. The direction of diffusion will later be described in detail with reference to FIGS. 5 through 7 and 9. The total number of pixels to be used for prediction indicates the total number of neighboring pixels that are present in various directions of diffusion and are available for prediction. At least one neighboring pixel is used for prediction.

The pixel value prediction unit 220 predicts the value of the current pixel from at least one neighboring pixel from among neighboring pixels present in various directions toward the current pixel by using variations between the values of the neighboring pixels, based on the results determined by the analysis unit 210. More specifically, the pixel value prediction unit 220 predicts the value of the current pixel by using the values of neighboring pixels, which correspond to at least one variation from among the variations between the values of the neighboring pixels present in the directions toward the current pixel. In particular, the pixel value prediction unit 220 selects the values of neighboring pixels corresponding to a smallest variation from among the variations. Such a variation is calculated using the difference or the gradient between the values of the neighboring pixels. The pixel value prediction unit 220 can select the values of neighboring pixels corresponding to at least one variation from among the variations in the directions toward the current pixel from among the neighboring pixels in an ascending order.

The predicted value of the current pixel is predicted using the values of the neighboring pixels corresponding to particular directions of diffusion, and thus does not reflect changes in the differences between the values of neighboring pixels of the current pixel, which do not correspond to the particular directions of diffusion. Thus, the predicted value needs to be compensated for using a correction value calculated by the correction value calculation unit 230.

The correction value calculation unit 230 calculates the correction value by using at least one change from among the changes between the values of the neighboring pixels. The predicted pixel value has been predicted from the neighboring pixels of the current pixel while considering only one direction showing the smallest value change from among the directions toward the current pixel. Thus, the values of neighboring pixels corresponding to the other directions of diffusion are not reflected in the predicted value. Thus, the correction value calculation unit 230 calculates the correction value from the values of the neighboring pixels by using slope coefficients, conduction coefficients, and distance coefficients that correspond to the directions toward the current pixel.

The slope coefficient means the variation between the values of neighboring pixels, which can be calculated using various mathematical methods. For example, the slope coefficient is obtained by calculating the difference or gradient between the values of the neighboring pixels. The conduction coefficient means a weight corresponding to the slope coefficient. The conduction coefficient is set in such a manner that the smaller the slope coefficient, the greater the conduction coefficient, so that the smaller the variation between the values of neighboring pixels, the greater the value of the current pixel can be affected by the conduction coefficient. The distance coefficient means a weight determined in consideration of the distance between a current pixel and a neighboring pixel. The distance coefficient is set in such a manner that the greater the distance between the current pixel and the neighboring pixel, the smaller the distance coefficient, so that the greater the distance between the current pixel and the neighboring pixel, the less the value of the current pixel can be affected by the distance coefficient.

The pixel value determination unit 240 compensates for the predicted value of the current pixel, which is predicted by the pixel value prediction unit 220, by using the correction value calculated by the correction value calculation unit 230, and then finally determines the value of the current pixel.

A method of finally determining the value of the current pixel from values received from the pixel value prediction unit 220 and the correction value calculation unit 230 according to an exemplary embodiment of the present invention is as follows:

$$\hat{I} = \alpha I_{pred} + \beta \left[ \sum_i \gamma_i c_i g_i \right], \quad (1)$$

wherein $\hat{I}$ denotes a finally predicted value of the current pixel, which is obtained by respectively applying weights $\alpha$ and $\beta$ to a value $I_{pred}$ received from the pixel value prediction unit 220 and a value $$\sum_i \gamma_i c_i g_i$$

received from the correction value calculation unit 230 and then summing up the resultant values.

More specifically, $I_{pred}$ is a predicted value of the current pixel, which is predicted from the neighboring pixels corresponding to a smallest variation from among the variations between the values of neighboring pixels present in the directions of diffusion. In brief, the values of the neighboring pixel corresponding to the smallest variation are used when predicting the value of the current pixel.

The correction value $$\sum_i \gamma_i c_i g_i$$

is calculated from a slope coefficient $g_i$, a conduction coefficient $c_i$, and a distance coefficient $r_i$ that are obtained from the values of the neighboring pixels present in the directions of diffusion. The correction value $$\sum_i \gamma_i c_i g_i$$

is used as a correction value of the predicted value $I_{pred}$. i denotes an index indicating the directions of diffusion of the current pixel.

The correction value $$\sum_i \gamma_i c_i g_i$$

may be the sum of the products of distance coefficients, conduction coefficients, and slope coefficients corresponding to more than one direction from among a plurality of directions of diffusion. In this case, more than one direction are selected from among the directions of diffusion, according to the characteristics of the image or the type of the application applied to the image.

$g_i$ denotes the slope coefficient of a direction i. The slope coefficient means the variation between the values of neighboring pixels, and can be calculated using various mathematical methods. For example, the slope coefficient $g_i$ can be obtained by calculating the difference or gradient between the values of neighboring pixels. A pixel value may be a brightness value Y or a chrominance signal value Cb or Cr.

$r_i$ denotes a distance coefficient indicating a weight determined in consideration of the distance between the current pixel and a neighboring pixel that are present in a direction of diffusion. It is expected that the shorter the distance between the current pixel and the neighboring pixel, the more the value of the neighboring pixel approximates to the value of the current pixel. Accordingly, the distance coefficient $r_i$ is set in such a manner that the shorter the distance between the current pixel and the neighboring pixel, the greater the value of the current pixel can be affected by the distance coefficient $r_i$.

$c_i$ denotes a conduction coefficient indicating the degree of similarity between the value of the current pixel and a value of a neighboring pixel. It can be determined that the greater the degree of similarity between the value of the current pixel and the value of the neighboring pixel, the greater the degree of conduction. The degrees of similarity between the value of the current pixel and the value of the neighboring pixel can be determined by the slope coefficient between the values of the neighboring pixels. That is, the difference between the value of the current pixel and the value of the neighboring pixel corresponding to a large slope coefficient is expected to be greater than the difference between the value of the current pixel and the value of the neighboring pixel corresponding to a small slope coefficient. Thus, a small conduction coefficient is coupled to a large slope coefficient. More specifically, if the slope coefficient is small, it is coupled to a high conduction coefficient, so that calculation of the value of the current pixel can be largely affected by the conduction coefficient. That is, if the slope coefficient is small with respect to a direction of diffusion, the conduction coefficient may approximate to "1", and if the slope coefficient is large with respect to the direction of diffusion, the conduction coefficient may approximate to "0". The conduction coefficient can be calculated using the following Equation (2) or (3), where the conduction coefficient is between 0 and 1:

$$c_i = f(\nabla g) = e^{(-(\|\nabla g\|/K)^2)} \quad (2)$$

That is, the correction value calculation unit 230 calculates the conduction coefficient $c_i$ by using a negative value of the square of a value obtained by dividing an absolute value of the slope coefficient □g by a predetermined constant K, and then using the resultant value as the exponent of e. If the slope coefficient between pixels in a direction of diffusion is small, that is, if the slope coefficient approximates to "0", the conduction coefficient $c_i$ calculated by the correction value calculation unit 230 will approximate to "1". If the slope coefficient between pixels in a direction of diffusion is very large, the conduction coefficient $c_i$ will approximate to "0". Here, the predetermined constant K is a value adjusted according to an environment of the present embodiment.

Alternatively, the conduction coefficient $c_i$ can be calculated using the following Equation (3). Equation (2) is difficult to be processed in a computer since it uses an exponential function. Thus, in Equation (3) is embodied a function that is approximate to an exponential function by using an addition operation, a multiplication operation, and a division operation without using the exponential function.

$$c_i = f(\nabla g) = \frac{1}{1 + \left(\frac{\|\nabla g\|}{K}\right)^2} \quad (3)$$

That is, the correction value calculation unit 230 calculates the conduction coefficient $c_i$ by adding "1" to the square of the value obtained by dividing the slope coefficient □g by a predetermined constant K, and calculating the reciprocal of the resultant value. Here, the predetermined constant K is a value adjusted according to an environment of the present embodiment.

After calculating the predicted value $I_{pred}$ and the correction value $$\sum_i \gamma_i c_i g_i,$$

the weights α and β are respectively applied thereto. The weights α and β are between 0 and 1. The reason of applying the weights α and β is in order to allocate different weights to the predicted value $I_{pred}$ calculated in a particular direction selected from among a plurality of directions of diffusion and the correction value $$\sum_i \gamma_i c_i g_i$$

calculated in consideration of all the directions of diffusion, depending on whether to place weight on the predicted value $I_{pred}$ or the correction value $$\sum_i \gamma_i c_i g_i$$

according to the characteristics of the image or the type of the application applied to the image. For example, a change between the values of pixels present in a direction of diffusion shows particular directionality, the weight a will approximate to "1".

The second intra prediction unit 117 predicts the value of the current pixel by using the values of neighboring pixels corresponding to the smallest variation from among the variations between the values of the neighboring pixels, and the variations between the values of the neighboring pixels.

Referring to FIG. 1, the intra prediction unit 115 includes the second intra prediction unit 117 and the first intra prediction unit 116 that considers directionality in units of blocks. One of the first intra prediction unit 116 and the second intra prediction unit 117 receives a selection signal from the intra prediction selection unit 110 and then performs an operation corresponding to the selection signal. If intra prediction is to be performed on a 4×4 block basis, the first intra prediction unit 116 uses a total of nine modes, i.e., a vertical mode, a horizontal mode, a direct current (DC) mode, a diagonal down-left mode, a diagonal down-right mode, a vertical right mode, a vertical left mode, a horizontal-up mode, and a horizontal-down mode, as intra prediction modes.

The second intra prediction unit 117 can perform prediction in units of pixels, in various directions and not only in a predetermined direction, according to the characteristics of the image or the type of the application applied to the image.

The subtraction unit 120 calculates the residue between a current image received from the outside and a predicted image received from the intra prediction unit 115 or the motion compensation unit 105 by subtracting the predicted image, from the current image.

The transformation unit 125 transforms the residue received from the subtraction unit 120 from a color domain to a frequency domain. For example, the transformation unit 125 can transform the residue received from the subtraction unit 120 from the color domain to the frequency domain by using discrete Hadamard transformation (DHT) or discrete cosine transformation (DCT). The quantization unit 130 quantizes the result of transformation received from the transformation unit 125. The entropy encoding unit 140 generates a bitstream by entropy encoding the result of quantization received from the quantization unit 130.

The dequantization unit 145 dequantizes the results of quantization received from the quantization unit 130. The inverse transformation unit 150 transforms the result of dequantization received from the dequantization unit 145 from the frequency domain to the color domain, thereby reconstructing the residue between the current image and the predicted image. The addition unit 155 adds the residue reconstructed by the inverse transformation unit 150 to the predicted image generated by the motion compensation unit 105 or the intra prediction unit 115, thereby generating a reconstructed image of the current image. The filter 160 reduces distortion at the edges of a plurality of blocks included in the reconstructed image generated by the addition unit 155, which is caused by a discontinuity between the blocks included in the reconstructed image.

The frame memory 165 stores the reconstructed image passing through the filter 160. The stored reconstructed image is used as a reference image for predicting the current image.

FIG. 3 illustrates a 4×4 current block that is to be intra predicted, and 4×4 blocks that are to be used for intra prediction. The size of a block can be variously set to 4×4, 8×8, or 16×16, as defined in a moving picture encoding apparatus.

FIG. 4 illustrates a sequence of predicting pixels present in a 4×4 block that is to be intra predicted, according to an example embodiment of the present invention.

Referring to FIG. 4, intra prediction is sequentially performed on a group of pixels a, b, c, d, e, i, and m; a group of pixels f, g, h, j, and n; a group of pixels k, l, and o; and a group of pixel p. In this case, a conduction coefficient $c_i$ that is to be used for intra prediction is calculated again to be updated for each group.

In order to intra predict the pixel values of a leftmost column (a, e, i, m) and an uppermost column (a,b,c,d) of a block that is to be predicted (hereinafter referred to as a "current block"), the pixels a, b, c, d, e, i, and m are grouped to one unit group and their values are predicted using pixels of blocks to the left and upper sides of the unit group. However, the value of a pixel belonging to the unit group is not predicted using the other pixels belonging to the unit group. For example, the value of the pixel a is not used to predict the value of the pixel b or e. After predicting the values of the pixels a, b, c, d, e, i, and m, the pixels f, g, h, j, and n are grouped to one unit group and their values are predicted using pixels of blocks to the left and upper sides of the unit group and the pixels a, b, c, d, e, i, and m. Likewise, the values of the pixels k, l, and o are predicted using the pixels of the blocks to the left and upper sides of the current block and the pixels of the unit groups which are present in the current block and the values of which have been already predicted.

Figure 5:
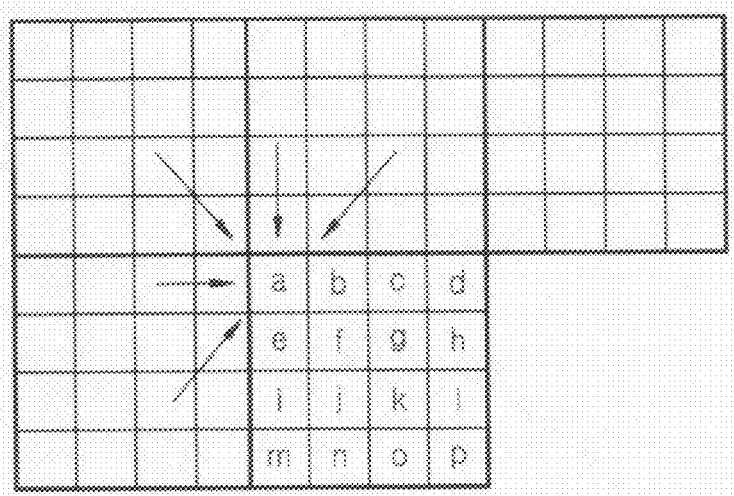
FIG. 5 illustrates various directions of diffusion when predicting a pixel a present in a 4×4 block that is to be intra predicted, according to an example embodiment of the present invention.

FIG. 5 illustrates various directions of diffusion when predicting a pixel a present in a 4×4 block that is to be intra predicted, according to an example embodiment of the present invention. The direction of diffusion means a direction from neighboring pixels to a current pixel.

Referring to FIG. 5, five directions can be considered in order to predict the value of the pixel a. However, the total number of directions for predicting the pixel a may be greater or less than five according to the characteristics of an image or the type of an application applied to the image.

Figure 6:
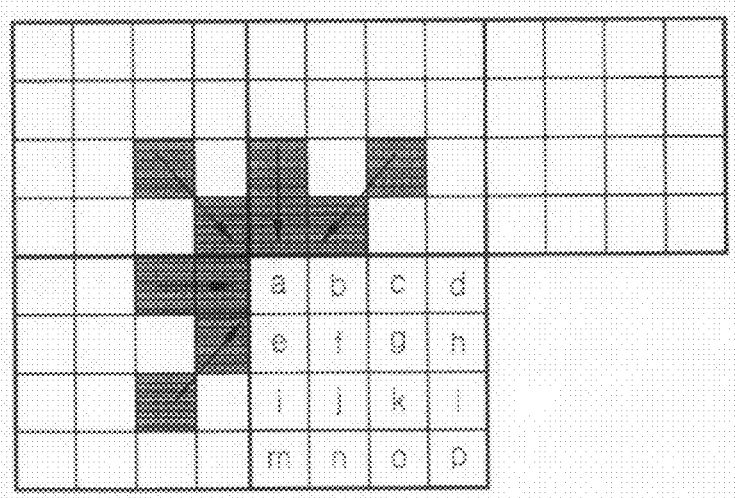
FIG. 6 illustrates various directions of diffusion when predicting a pixel a present in a 4×4 block that is to be intra predicted, and pixels corresponding to the directions of diffusion according to an example embodiment of the present invention.

FIG. 6 illustrates various directions of diffusion when predicting a pixel a present in a 4×4 block that is to be intra predicted, and pixels corresponding to the directions of diffusion according to an example embodiment of the present invention. Although FIG. 6 illustrates that two neighboring pixels in each direction of diffusion are used in order to calculate the slope coefficient, the total number of pixels corresponding to each direction of diffusion may be less than or greater than two. The slope coefficient of each of five directions of diffusion that can be considered in predicting the value of a pixel a illustrated in FIG. 6 is calculated using two neighboring pixels. In this case, a direction which is corresponds to the smallest slope coefficient from among the calculated slope coefficients is selected, and a predicted value $I_{pred}$ of the pixel a is calculated from the values of neighboring pixels present in the selected direction. For example, if the predicted value $I_{pred}$ of the pixel a is determined to be predicted using one of neighboring pixels adjacent to the pixel a, the predicted value $I_{pred}$ of the pixel a is one of A, B, I, J, and M. Thus, the slope coefficients of the directions of diffusion are calculated, at least one direction of diffusion is selected from among the directions of diffusion based on the calculated slope coefficients, and then, the value of a current pixel is calculated from the values of neighboring pixels in the selected direction.

Figure 7:
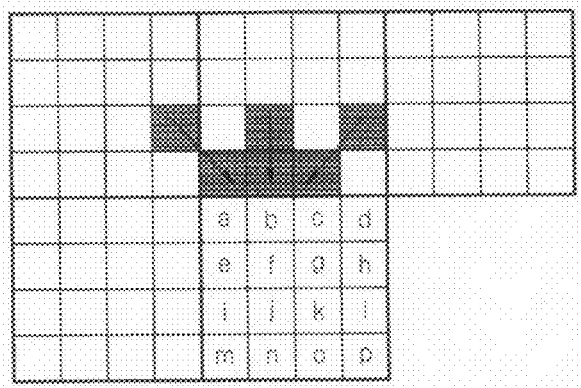
FIG. 7 illustrates various directions of diffusion and the total number of pixels to be used when predicting a pixel b present in a 4×4 block that is to be intra predicted, according to an example embodiment of the present invention.

FIG. 7 illustrates various directions of diffusion and the total number of pixels to be used when predicting a pixel b present in a 4×4 block that is to be intra predicted, according to an example embodiment of the present invention. The total number of directions of diffusion considered in order to predict the value of the pixel b is different from that of directions of diffusion considered in order to predict the value of the pixel a as illustrated in FIG. 6, since pixels a, b, c, d, e, i, and m belong to the same group and each of the pixels a, b, c, d, e, i, and m is not used as a neighboring pixel in order to predict the other pixels. Similarly, the pixels a, c, d, e, i, and m are not used as neighboring pixels in order to predict the value of the pixel b. Thus, when predicting the value of the pixel b, the directions of diffusion in which the pixels a and e are present are not considered. Likewise, when predicting the values of pixels f, g, h, j, and n, the pixels a, b, c, d, e, i, and m can be used as neighboring pixels since they do not belong to a group to which the values of pixels f, g, h, j, and n belong. However, each of the pixels f, g, h, j, and n is not used as a neighboring pixel in order to predict the values of the other pixels since they belong to the same group.

Figure 8:
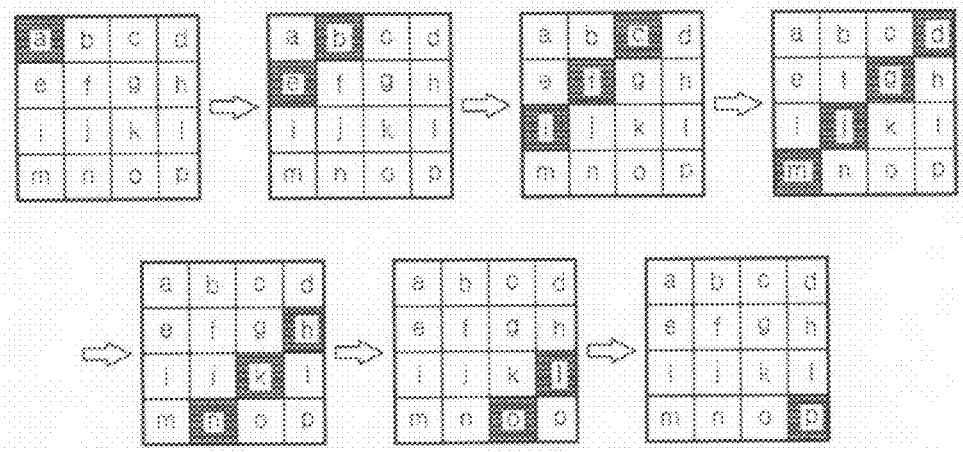
FIG. 8 illustrates a sequence of predicting pixels present in a 4×4 block that is to be intra predicted, according to another example embodiment of the present invention.

FIG. 8 illustrates a sequence of predicting pixels present in a 4×4 block that is to be intra predicted, according to another example embodiment of the present invention. Referring to FIG. 8, intra prediction is sequentially performed on the pixels in a diagonal direction, i.e., in the order from a pixel a, and finally to a pixel p.

Figure 9:
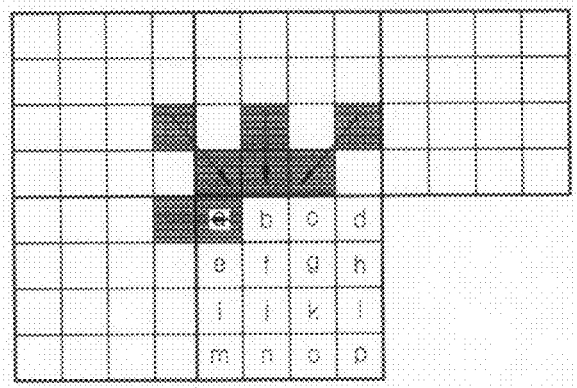
FIG. 9 illustrates various directions of diffusion and a total number of pixels to be used when predicting a pixel b present in a 4×4 block that is to be intra predicted according to the sequence of predicting as illustrated in FIG. 8, according to an example embodiment of the present invention.

FIG. 9 illustrates various directions of diffusion and a total number of pixels to be used when predicting a pixel b present in a 4×4 block that is to be intra predicted according to the sequence of predicting as illustrated in FIG. 8, according to an example embodiment of the present invention. A comparison of FIGS. 7 and 9 reveals that a direction of diffusion is affected by the sequence of performing intra prediction on the pixels in a 4×4 block that is to be intra predicted. In FIG. 7, a direction in which a pixel a is present is not considered as a direction of diffusion, whereas in FIG. 9, the direction in which the pixel a is present is considered as a direction of diffusion. Whether the direction in which the pixel a is present is considered as a direction of diffusion depends on whether the pixels a and b belong to the same group.

More specifically, the total number of directions of diffusion depends on whether the sequence of performing prediction as illustrated in FIG. 4 is to be selected or the sequence of performing prediction as illustrated in FIG. 8 is to be selected. For example, referring to FIG. 7, if the value of a pixel b is predicted in the sequence of performing intra prediction as illustrated in FIG. 4, the total number of directions of diffusion is three. Referring to FIG. 9, if the value of the pixel b is predicted in the sequence of performing intra prediction as illustrated in FIG. 8, the total number of directions of diffusion is four.

FIG. 9 is different from FIG. 7 in that the value of the pixel a is available as a neighboring pixel when predicting the value of the pixel b. This difference occurs depending on whether the pixels a and b belong to the same group. Referring to FIG. 9, since the pixels a and b belong to different groups, a predicted value of the pixel a has already been stored in the frame memory 165 prior to predicting of the value of the pixel b. Thus, the pixel b can be predicted using the value of the pixel a as a neighboring pixel.

Figure 10:
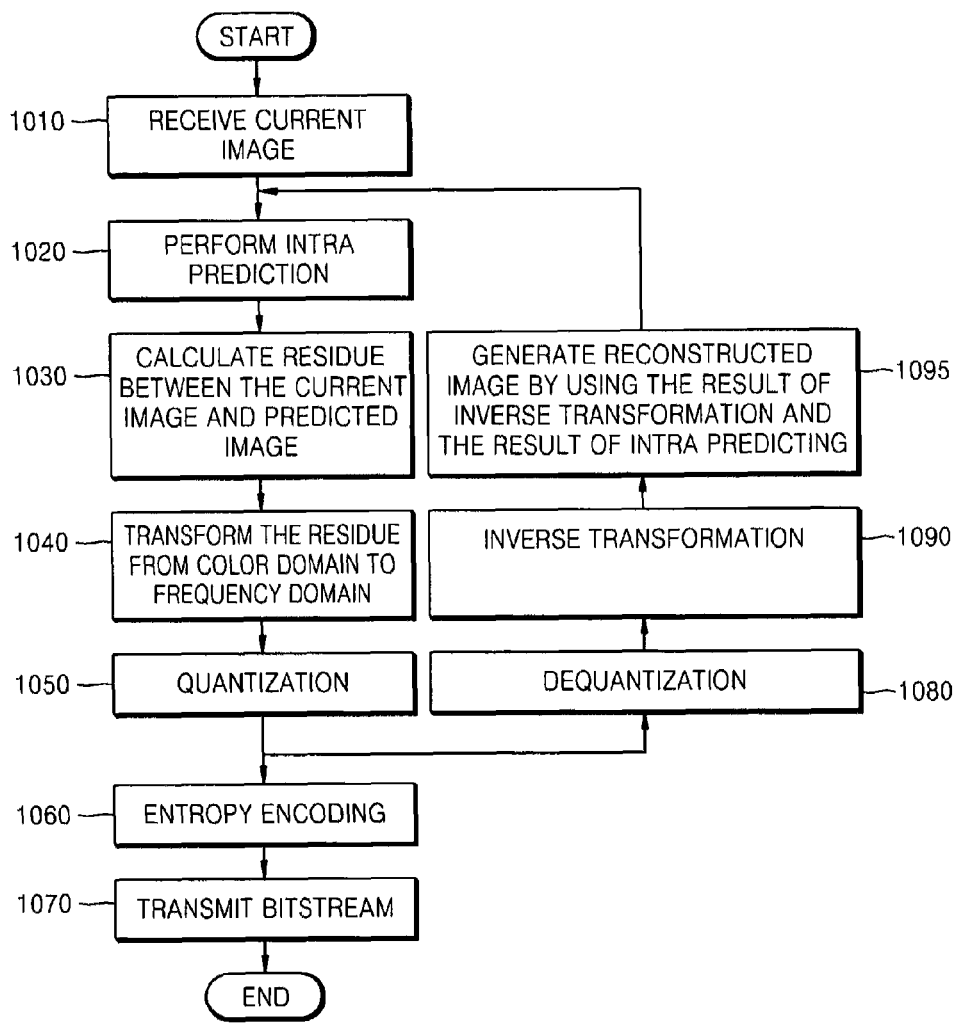
FIG. 10 illustrates a method of encoding a moving picture according to an example embodiment of the present invention.

FIG. 10 illustrates a method of encoding a moving picture according to an example embodiment of the present invention. The method of FIG. 10 includes a plurality of operations that are sequentially performed by the apparatus illustrated in FIG. 1. Thus, although not described here, the above description regarding the apparatus of FIG. 1 can also be applied to the method of FIG. 10.

In operation 1010, a moving picture encoding apparatus ("the encoding apparatus") receives a current image. The current image may be Y-Cb-Cr image or R-G-B image.

In operation 1020, the encoding apparatus generates a predicted image of the current image by predicting the value of a current pixel from the values of pixels of reconstructed image blocks adjacent to a current block with respect to each of a plurality of blocks constituting the received current image. In detail, in operation 1020, either an intra prediction method that uses the diffusion properties of an image or an intra prediction method that is performed in units of blocks in consideration of the directionality of the blocks is selected based on the characteristics of the image or the type of an application applied to the image, and then, a predicted image of the current image is generated according to the selected intra prediction method.

In operation 1030, the encoding apparatus calculates the residue between the current image and the predicted image obtained in operation 1020.

In operation 1040, the encoding apparatus transforms the residue calculated in operation 1030 from a color domain to a frequency domain.

In operation 1050, the encoding apparatus quantizes residues transformed into the frequency domain.

In operation 1060, the encoding apparatus entropy encodes the results of quantization into a bitstream.

In operation 1070, the encoding apparatus transmits the bitstream to a moving picture decoding apparatus.

In operation 1080, the encoding apparatus dequantizes the results of quantization obtained in operation 1050.

In operation 1090, the encoding apparatus transforms the results of dequantization obtained in operation 1080 from the frequency domain to the color domain, thereby reconstructing the residue calculated in operation 1030.

In operation 1095, the encoding apparatus combines the predicted image obtained in operation 1020 with the residue reconstructed in operation 1090, thus obtaining a reconstructed image.

Figure 11:
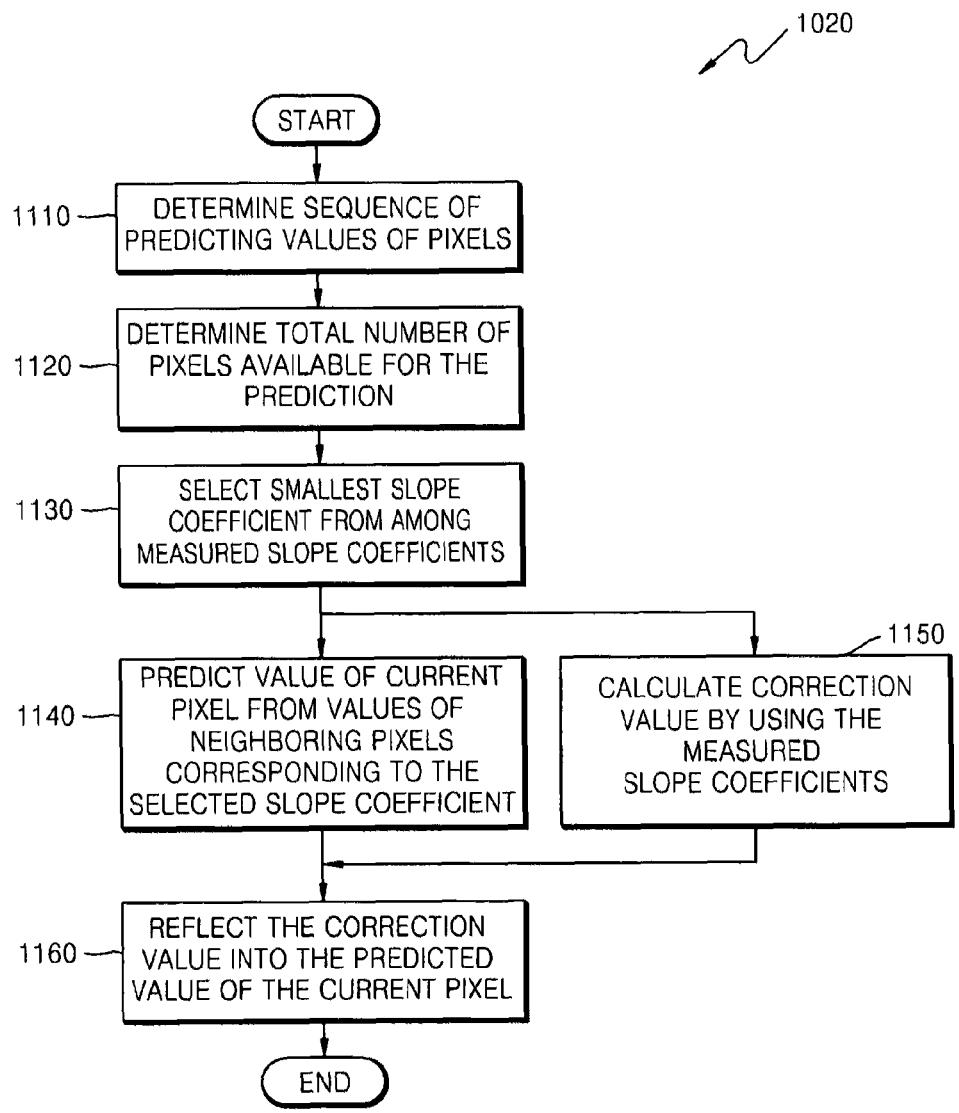
FIG. 11 illustrates an intra prediction method using the diffusion properties of an image in order to encode a moving picture, according to an example embodiment of the present invention.

FIG. 11 illustrates an intra prediction method using the diffusion properties of an image in order to encode a moving picture, according to an example embodiment of the present invention. Referring to FIG. 11, the intra prediction method includes a plurality of operations that are sequentially performed by the second intra prediction unit 117 included in the intra prediction unit 115 illustrated in FIG. 1. Thus, although not described here, the above description regarding the second intra prediction unit 117 illustrated in FIG. 2 can also be applied to the intra prediction method of FIG. 11.

If in operation 1020 illustrated in FIG. 10, the intra prediction method using the diffusion properties of an image according to the exemplary embodiment is selected, the following operations will be performed.

In operation 1110, the second intra prediction unit 117 determines a sequence of predicting the values of pixels of a unit block of a current image. The second intra prediction unit 117 determines a sequence of predicting the values of pixels of the unit block according to the characteristics of the image or the type of an application applied to the image.

In operation 1120, the second intra prediction unit 117 determines a total number of pixels to be used in predicting the value of a current pixel with respect to directions of diffusion. The second intra prediction unit 117 determines a total number of pixels to be used for the prediction according to the characteristics of the image or the type of an application applied to the image.

In operation 1130, the second intra prediction unit 117 measures the slope coefficient of each of directions of diffusion toward the current pixel, and selects a smallest slope coefficient from among the measured slope coefficients. The slope coefficient means the variation between the values of neighboring pixels, and can be calculated using various mathematical methods. For example, the slope coefficient may be obtained by calculating the difference or the gradient between the values of neighboring pixels.

In operation 1140, the second intra prediction unit 117 predicts the value of the current pixel from the values of neighboring pixels corresponding to the selected slope coefficient.

In operation 1150, the second intra prediction unit 117 calculates a correction value of the current pixel from the slope coefficients measured in operation 1130. The second intra prediction unit 117 calculates the correction value by using all the measured slope coefficients. However, the second intra prediction unit 117 may calculate the correction value by using only some of the measured slope coefficients, depending on the characteristics of the image.

In operation 1160, the second intra prediction unit 117 determines the value of the current pixel by reflecting the correction value calculated in operation 1150 into the predicted value of the current pixel obtained in operation 1140.

Figure 12:
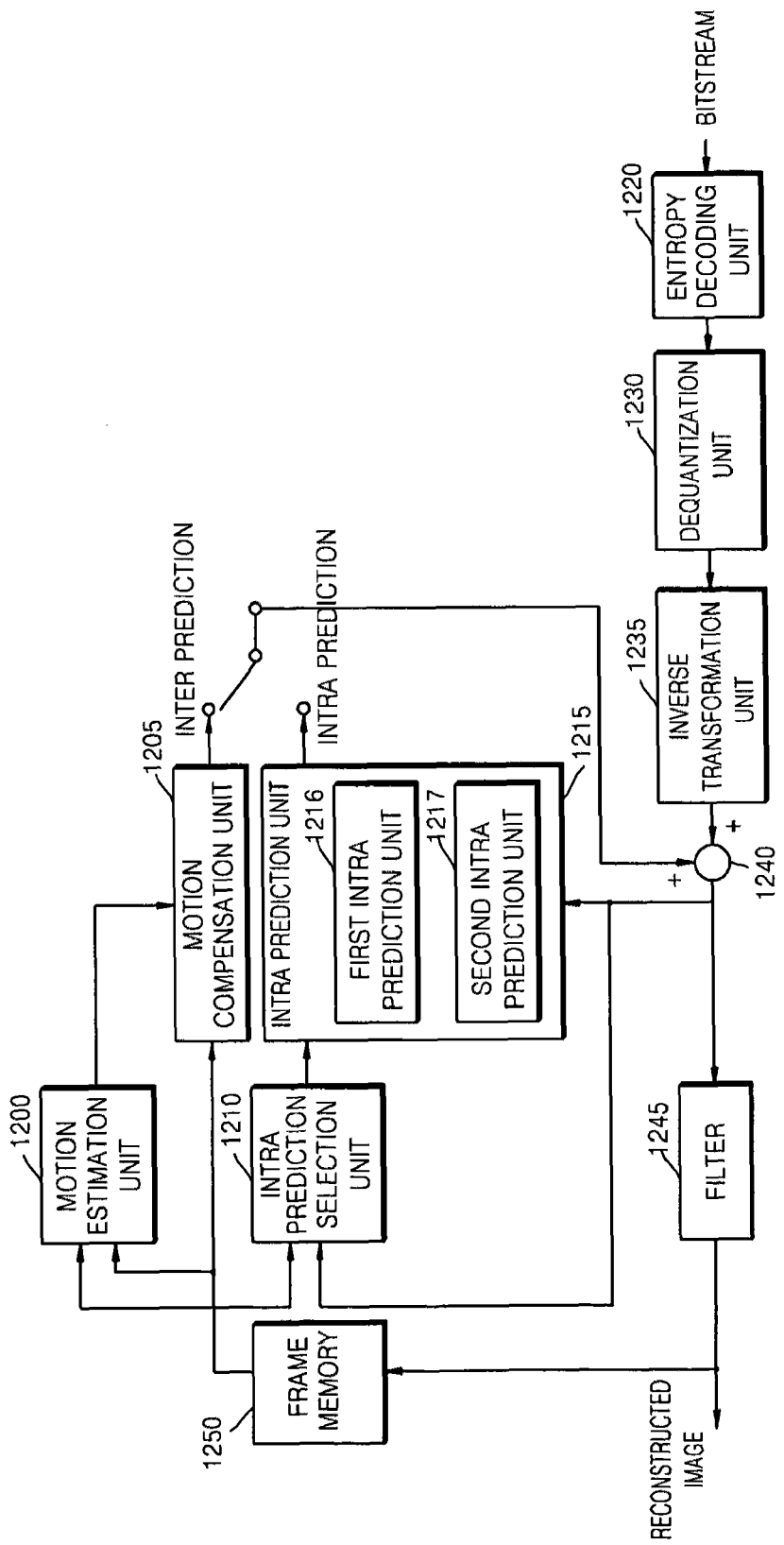
FIG. 12 illustrates a moving picture decoding apparatus according to an example embodiment of the present invention.

FIG. 12 illustrates a moving picture decoding apparatus ("the decoding apparatus") according to an example embodiment of the present invention. Referring to FIG. 12, the decoding apparatus includes a motion estimation unit 1200, a motion compensation unit 1205, an intra prediction selection unit 1210, an intra prediction unit 1215, an entropy-decoding unit 1220, a dequantization unit 1230, an inverse transformation unit 1235, an addition unit 1240, a filter 1245, and a frame memory 1250. The intra prediction unit 1215 includes a first intra prediction unit 1216 and a second intra prediction unit 1217.

Constitutional elements of the decoding apparatus that are the same as those of FIG. 1 denote the same elements, and thus, a description of their operations will be omitted here. Accordingly, the following explanation will focus on the other constitutional elements of the decoding apparatus, which are different from those of the encoding apparatus The entropy decoding unit 1220 entropy-decodes a bitstream received from a moving picture encoding apparatus, and outputs the result of decoding to the dequantization unit 1230.

The intra prediction unit 1215 includes a first intra prediction unit 1216 and a second intra prediction unit 1217. The construction of the first intra prediction unit 1216 is the same as that of the first intra prediction unit 116 illustrated in FIG. 1.

Also, the construction of the second intra prediction unit 1217 included in the intra prediction unit 1215 illustrated in FIG. 12 is as illustrated in FIG. 2.

However, the intra prediction selection unit 1210 checks whether the bitstream contains an identifier indicating that encoding was performed according to an intra prediction method using the diffusion properties of an image. An analysis unit 210 of the second intra prediction unit 1217 included in the intra prediction unit 1215 analyzes a sequence of predicting pixels, directions of diffusion, and the total number of pixels to be used for the prediction, which are contained in the bitstream. The analyzed sequence of predicting pixels, the directions of diffusion, and the total number of pixels to be used for the prediction are used by the pixel value prediction unit 220 and the correction value calculation unit 230.

Figure 13:
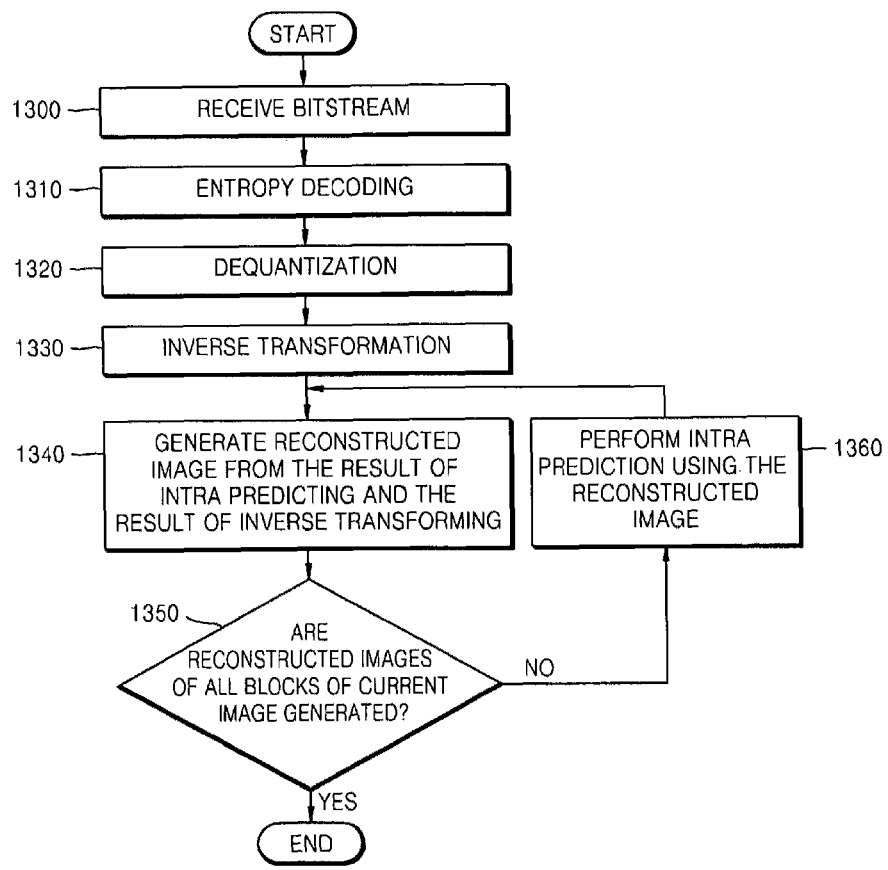
FIG. 13 illustrates a method of decoding a moving picture according to an example embodiment of the present invention.

FIG. 13 illustrates a method of decoding a moving picture according to an example embodiment of the present invention. Referring to FIG. 13, the method includes a plurality of operations that are sequentially performed by the decoding apparatus of FIG. 12. Thus, although not described here, the above description regarding the decoding apparatus illustrated in FIG. 12 can also be applied to the method of FIG. 13.

In operation 1300, a moving picture decoding apparatus ("the decoding apparatus") receives a bitstream from a moving picture encoding apparatus.

In operation 1310, the decoding apparatus entropy decodes the bitstream.

In operation 1320, the decoding apparatus dequantizes the results of entropy decoding.

In operation 1330, the decoding apparatus inversely transforms the results of dequantization.

In operation 1340, the decoding apparatus combines the result of inversely transforming with a predicted image generated by an intra prediction unit, thereby generating a reconstructed image of a current image.

In operation 1350, the decoding apparatus determines whether reconstructed images of all blocks of the current image are generated. If it is determined that reconstructed images of all the blocks of the current image are not generated, the method proceeds to operation 1360. If it is determined that reconstructed images of all the blocks of the current image are generated, the method is completed.

In operation 1360, the decoding apparatus performs intra prediction on another block by using the generated reconstructed images.

Figure 14:
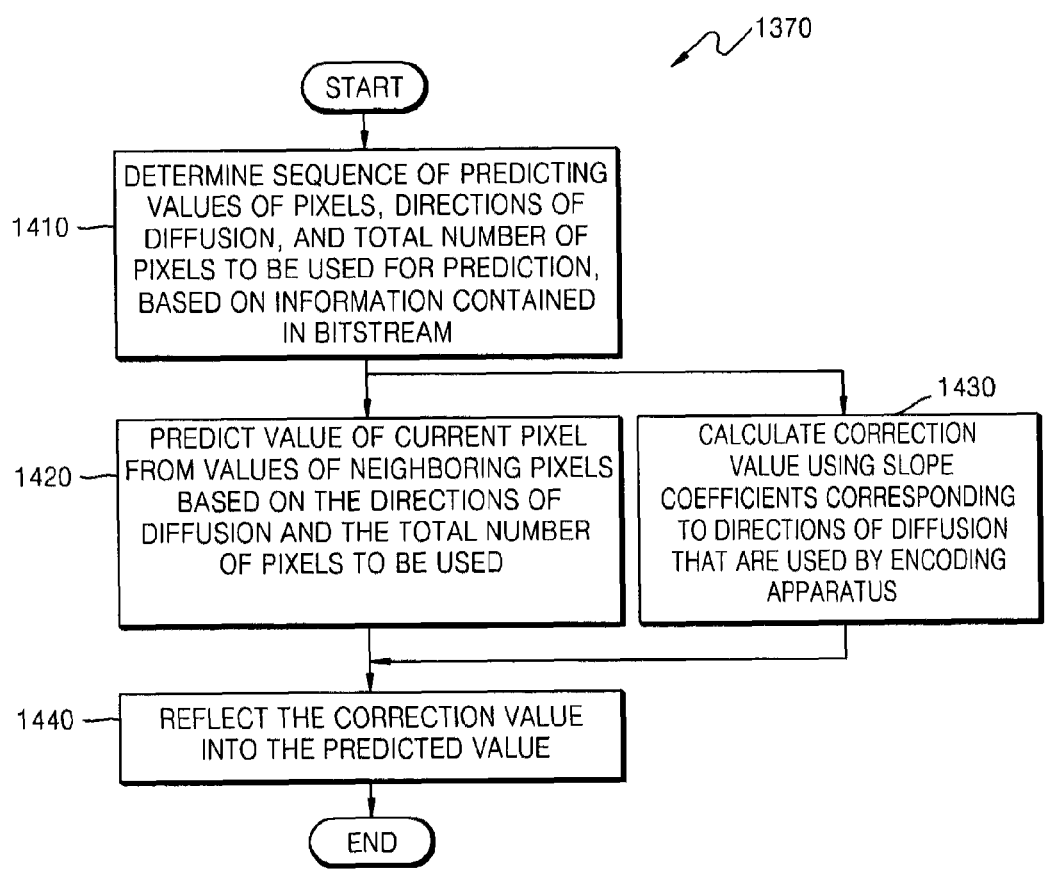
FIG. 14 illustrates an intra prediction method using the diffusion properties of an image in order to decode a moving picture, according to an example embodiment of the present invention.

FIG. 14 illustrates an intra prediction method using the diffusion properties of an image in order to decode a moving picture, according to an example embodiment of the present invention. Referring to FIG. 14, the intra prediction method includes a plurality of operations that are sequentially performed by the second intra prediction unit 1217 included in the intra prediction unit 1215. Thus, although not described here, the above description regarding the second intra prediction unit 1217 can also be applied to the method of FIG. 14.

In operation 1370 illustrated in FIG. 13, if the intra prediction selection unit 1210 selects an intra prediction method using the diffusion properties of an image according to an exemplary embodiment of the present invention, the second intra prediction unit 1217 performs the following operations.

In operation 1410, the second intra prediction unit 1217 determines a sequence of predicting the values of pixels, directions of diffusion, and the total number of pixels used for the prediction with respect to a unit block of a current image, which have been used in an encoding apparatus, based on information contained in a bitstream received the encoding apparatus.

In operation 1420, the second intra prediction unit 1217 predicts the value of a current pixel from the values of neighboring pixels corresponding to the directions of diffusion and the total number of pixels used for the prediction, which are determined in operation 1410.

In operation 1430, the second intra prediction unit 1217 calculates a correction value by using slope coefficients corresponding to the directions of diffusion. The slope coefficients may be equal to those used by the second intra prediction unit 117 illustrated in FIG. 1.

In operation 1440, the second intra prediction unit 1217 determines the value of the current pixel by reflecting the correction value obtained in operation 1430 into the predicted value of the current pixel obtained in operation 1420.

As described above, according to an exemplary embodiment of the present invention, it is possible to increase compression efficiency by using the first intra prediction unit 116 and the second intra prediction unit 117 in a selective manner, since intra prediction performed in units of blocks can be more efficient than intra prediction using the diffusion properties of an image in some cases or the intra prediction using the diffusion properties of an image can be more efficient than the intra prediction performed in units of blocks in other cases according to the characteristics of an image or the type of an application applied to the image. In the case of intra prediction using the diffusion properties of an image, not only a total number of directions of diffusion but also a total number of pixels to be used for calculating the slope coefficient may vary according to a sequence of predicting the values of pixels. Accordingly, it is possible to increase compression efficiency by changing such parameters according to the characteristics of an image or the type of an application applied to the image.

Since the first intra prediction unit 116 that consider directionality in units of blocks and the second intra prediction unit 117 can be used in a selective manner, the precision of intra prediction can be increased. Since two types of prediction units are used, desired prediction modes can be used from among intra prediction modes using the diffusion properties of an image and intra prediction modes performed in units of blocks when the amount of calculation is large, thereby significantly reducing the amount of calculation. In the intra prediction modes using the diffusion properties of an image, prediction can be adaptively performed in various directions, and thus, the amount of calculation is less than in the intra prediction modes considering the directionality in units of blocks.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), for example. The media may also be a distributed network, so that the computer readable code is stored/transferred and executed in a distributed fashion. Still further, as only an example, the processing element could include a processor or a computer processor, and processing elements may be distributed and/or included in a single device.

While aspects of the present invention has been particularly shown and described with reference to differing embodiments thereof, it should be understood that these exemplary embodiments should be considered in a descriptive sense only and not for purposes of limitation. Any narrowing or broadening of functionality or capability of an aspect in one embodiment should not considered as a respective broadening or narrowing of similar features in a different embodiment, i.e., descriptions of features or aspects within each embodiment should typically be considered as available for other similar features or aspects in the remaining embodiments.

Thus, although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of decoding a moving picture, the method comprising:
reconstructing the residue between a current image from among a plurality of images constituting the moving picture, and a predicted image of the current image by decoding a bitstream;
predicting, by a processor, a value of a current pixel of the current image from at least one neighboring pixel from among neighboring pixels located in various directions toward the current pixel, based on the variations between values of the neighboring pixels; and generating a reconstructed image of the current image by combining the reconstructed residue with the predicted image containing the predicted value of the current pixel, wherein the predicting of the value of the current pixel comprises:

calculating a correction value of the predicted value of the current pixel by using the variations between the values of the neighboring pixels; and compensating for the predicted value of the current pixel by using the correction value.

2. The method of claim 1, wherein the predicting of the value of the current pixel comprises:

predicting the value of the current pixel from at least one neighboring pixel corresponding to a smallest variation from among the variations between the values of the neighboring pixels.

3. The method of claim 1, wherein the predicting of the value of the current pixel comprises:

predicting the value of the current pixel from at least one neighboring pixel corresponding to at least one direction from among various directions toward the current pixel of the current image.

4. The method of claim 3, wherein the calculating of the correction value comprises:

adjusting a weight to be allocated to each of the variations according to sizes of the variations; and calculating the correction value of the predicted value of the current pixel by using the variations to which the adjusted weights are respectively allocated.

5. The method of claim 1, wherein the predicting of the value of the current pixel comprises:

determining a direction corresponding to a smallest variation from among the variations between the values of the neighboring pixels by analyzing the bitstream; and predicting the value of the current pixel from neighboring pixels corresponding to the determined direction.

6. The method of claim 1, wherein the predicting of the value of the current pixel comprises:

determining a total number of pixels that are to be used in calculating the variations between the values of the neighboring pixels by analyzing the bitstream; and predicting the value of the current pixel from at least one neighboring pixel from among the neighboring pixels based on the variations between the values of the determined total number of neighboring pixels.

7. The method of claim 1, further comprising determining a sequence of predicting pixels of the current image by analyzing the bitstream, and selecting the current pixel from among a plurality of pixels of the current image in the determined sequence.

8. The method of claim 1, further comprising selecting one of an intra prediction method performed in units of blocks specified in the H.264/AVC (Advanced Video Coding) standards, and an intra prediction method predicting the value of the current pixel in unit of pixel by analyzing the bitstream.

9. The method of claim 1, wherein the variations between the values of the neighboring pixels are calculated using the differences between brightness values or chrominance signal values of the neighboring pixels.

10. The method of claim 1, wherein if the current image is divided into more than one block and a plurality of pixels present in each of the blocks are divided into more than one group, the neighboring pixels that are to be used in predicting the value of the current pixel are selected from among a group of already predicted pixels.

11. The method of claim 1, wherein during the predicting of the value of the current pixel, if the current image is divided into more than one block and a plurality of pixels present in each of the blocks are divided into more than one group, weights corresponding to each of the variations is calculated in units of the groups.

12. A method of encoding a moving picture, the method comprising:

predicting, by a processor, a value of a current pixel of a current image from among a plurality of images constituting a moving picture from at least one neighboring pixel from among neighboring pixels located in various directions toward the current pixel, based on the variations between values of the neighboring pixels;

generating a predicted image of the current image based on the predicted value of the current pixel; and encoding the residue between the current image and the predicted image, wherein the predicting of the value of the current pixel comprises:

calculating a correction value of the predicted value of the current pixel by using the variations between the values of the neighboring pixels; and compensating for the predicted value of the current pixel by using the correction value.

13. The method of claim 12, wherein during the predicting of the value of the current pixel, the value of the current pixel is predicted from at least one neighboring pixel corresponding to a smallest variation from among the variations between values of the neighboring pixels.

14. The method of claim 12, wherein the predicting of the value of the current pixel comprises:

predicting the value of the current pixel from at least one neighboring pixel corresponding to at least one direction from among the various directions toward the current pixel.

15. The method of claim 14, wherein the calculating of the correction value comprises:

adjusting weights to be allocated to each of the variations according to sizes of the variations; and calculating the correction value by using the variations to which the adjusted weights are respectively allocated.

16. The method of claim 12, wherein the variations between the values of the neighboring pixels are calculated using the differences between brightness values or chrominance signal values of the neighboring pixels.

17. The method of claim 12, further comprising selecting one of an intra prediction method performed in units of blocks specified in the H.264/AVC (Advanced Video Coding) standards, and an intra prediction method predicting the value of the current pixel, according to characteristics of the current image.

18. The method of claim 12, wherein if the current image is divided into more than one block and a plurality of pixels present in each of the blocks are divided into more than one group, the neighboring pixels that are to be used in predicting the value of the current pixel are selected from among a group of already predicted pixels.

19. The method of claim 12, wherein during the predicting of the value of the current pixel, if the current image is divided into more than one block and a plurality of pixels present in each of the blocks are divided into more than one group, weights corresponding to each of the variations are calculated in units of the groups.

20. A non-transitory computer readable medium having recorded thereon a computer program for executing a method of decoding a moving picture, the method comprising:

decoding a bitstream in order to reconstruct the residue between a current image from among a plurality of images constituting the moving picture, and a predicted image of the current image;

predicting a value of a current pixel of the current image from at least one neighboring pixel from among neighboring pixels located in various directions toward the current pixel, based on the variations between values of the neighboring pixels; and generating a reconstructed image of the current image by combining the reconstructed residue with the predicted image containing predicted pixel values, wherein the predicting of the value of the current pixel comprises:

calculating a correction value of the predicted value of the current pixel by using the variations between the values of the neighboring pixels; and compensating for the predicted value of the current pixel by using the correction value.

\* \* \* \* \*